Jan. 17, 1961     E. P. D'AZZO     2,968,461
AWNING HEAD ROD CLAMP
Filed Oct. 21, 1957
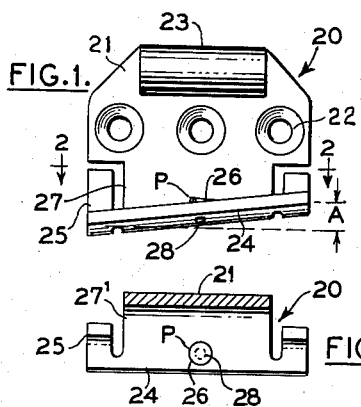
FIG.1.
FIG.2.
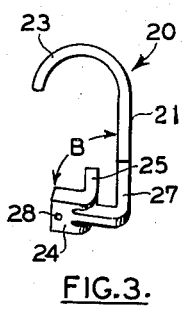
FIG.3.
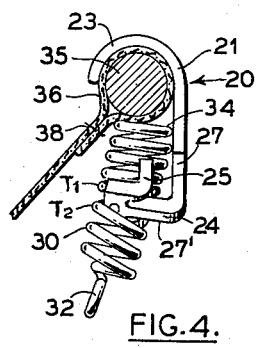
FIG.4.
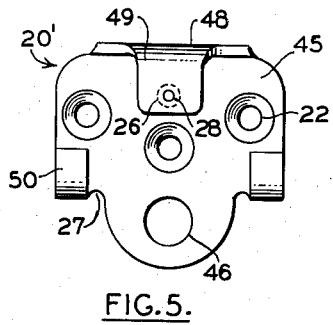
FIG.5.
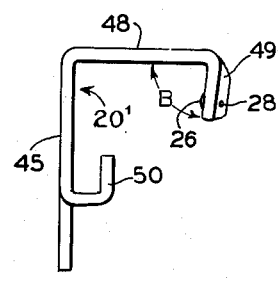
FIG.6.
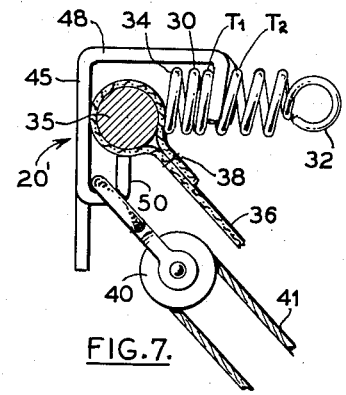
FIG.7.
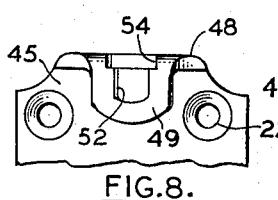
FIG.8.
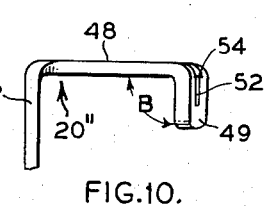
FIG.10.
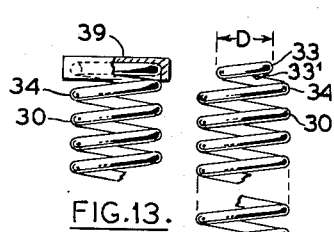
FIG.13.
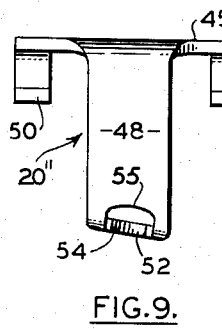
FIG.9.
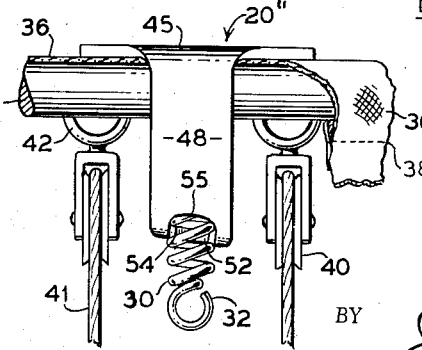
FIG.11.
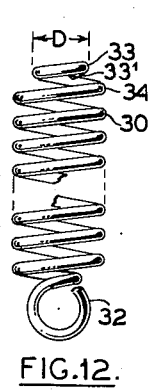
FIG.12.
INVENTOR.
ERROL P. D'AZZO
BY
J. B. Burke
ATTORNEY

United States Patent Office 2,968,461
Patented Jan. 17, 1961

2,968,461
AWNING HEAD ROD CLAMP

Errol P. D'Azzo, Brooklyn, N.Y.
(152 Bleecker St., New York, N.Y.)

Filed Oct. 21, 1957, Ser. No. 691,319

18 Claims. (Cl. 248—273)

This invention relates to the art of awning head rod holders and particularly concerns a head rod clamp including a bracket and spring clamping member.

The invention is primarily directed at providing a head rod clamp in which a coil spring is employed as a wedging member to secure a head rod in a bracket.

A further object is to provide a head rod clamp blacket for use with a helical coil spring which serves as a threaded wedging member.

Heretofore, awning head rod holders have used brackets with various types of threaded nuts and bolts to secure head rods therein. These threaded members are exposed to weathering during normal use and quickly become rusted so that soon after installation it becomes difficult or impossible to unscrew them for removal of the head rod from the holder when repairing or replacing the awning. A further objection is the expense involved in supplying separate threaded fastening members, and the cost of labor and loss of time in assembling these threaded members.

The present invention overcomes the above difficulties and provides the advantages of a single, helical coil spring employed in conjunction with a suitably formed bracket to provide a quick attachable and detachable assembly in a convenient inexpensive form.

The invention will be best understood from the following detailed description taken together with the drawing, wherein:

Fig. 1 is a front elevational view of one form of bracket embodying the invention. Fig. 2 is a sectional view of Fig. 1 taken on lines 2—2 of Fig. 1. Fig. 3 is an end view of the bracket.

Fig. 4 is an end view of the bracket assembled with a coil spring and supporting an awning head rod therein.

Fig. 5 is a front elevational view of another form of bracket embodying the invention. Fig. 6 is an end view of the bracket of Fig. 5.

Fig. 7 is an end view of an assembled head rod holder including the bracket of Fig. 5, a coil spring, awning head rod and pulley.

Fig. 8 is a front elevational view of a portion of another form of bracket embodying the invention. Fig. 9 is a top plan view and Fig. 10 is an end view of the bracket of Fig. 8.

Fig. 11 is a top plan view of an assembled head rod holder including the bracket of Fig. 8, coil spring, head rod, and pulleys.

Fig. 12 is a side view of one form of coil spring employed in the head rod holder clamp according to the invention.

Fig. 13 is a side view of a portion of another coil spring structure.

Referring to Figs. 1–4 there is shown a bracket 20 including a flat wall or plate 21 having a plurality of spaced countersunk holes 22. These holes are adapted to receive mounting screws whereby the bracket can be mounted on a suitable supporting flat surface, such as a vertical wall. The bracket has a curved eave 23 formed by bending over one end portion of plate. The other end of plate 21 is bent upwardly and outwardly to form a shelf or ledge 24. This shelf is twisted or bent so that it extends longitudinally at an acute angle to the longitudinal axis of the curved eave 23. The shelf thus forms the acute angle A as indicated in Fig. 1 and acute angle B as indicated in Fig. 2. The rear ends of the shelf 24 are bent upwardly to form hooks 25 on which can be supported pulleys 40 as shown in Figs. 7 and 11 for carrying awning ropes 41. Opposite end portion 27 of the plate 21 are cut out as are adjoining portions 27' of shelf 24 to provide space for inserting pulley bracket loops 42 on the hooks 25.

Centrally disposed on shelf 24 and near the free edge thereof is a small stud or tit 26. This tit may be an element secured in an aperture 28 in the shelf or may be otherwise integrally formed thereon. The tit projects toward eave 23 and has a slanted top which is inclined to the top surface of shelf 24. The tit is preferably a truncated right cylinder and is so formed that its top slants uniformly from the top surface of the shelf to an elevated point P at the periphery of the tit. The tit is so shaped that helical coil spring 30 can readily be mounted on the shelf. The lowermost portion of the tit is near the front free edge of the shelf or slightly turned therefrom. Thus any two adjacent turns $T_1$ and $T_2$ of the spring can be engaged on the shelf by pushing upper turn $T_1$ over the tit starting at the lowermost point thereof while the other lower turn $T_2$ slides into contact with the lower surface of the shelf. The normal spacing of the turns when the spring is untensioned should be slightly less than the distance from the bottom of the shelf to the point P on the tit, so that turn $T_1$ will snap over the tit. Then the spring can be rotated or turned to advance it or retract it with respect to eave 23 and will be retained on the shelf 24 by the tit.

Spring 30 has a flat coiled extension 32 of its lowermost loop which serves as a handle for manually turning the spring like a threaded member. The upper end of the spring is preferably formed as best shown in Fig. 12. The end turn 33 has a diameter D which is equal to or less than the inner diameter of the remainder of the coil turns and the free end 33' of turn 33 is bent inwardly. This structure makes it possible for the end turn to be compressed or recessed into the next adjacent turn 34 so that when the spring is tightened up against head rod 35, the awning cloth 37 disposed between the rod and spring is not torn by the free end of the spring. If desired a smooth metal cap 39 can be placed over the end of the spring as shown in Fig. 13 to avoid tearing the awning fabric instead of forming the narrow end turn 33.

In Fig. 4 is shown the manner in which the head rod 35 fits into the eave 23. Awning fabric 36 made of canvas or other cloth material encircles the rod and is secured thereon by stitching 38.

When the spring 30 is fully tightened against the rod 35, the inner side of the spring is wedged against the front surface of plate 21 and the end of the spring at turn 34 abuts the under side of rod 35. The spring can be tightened until a solid wedge is formed which cannot be loosened without unscrewing the spring. In this structure the use of only one threaded member is required. This contrasts with the conventional nut and bolt assembly where at least two threaded parts are required.

In Figs. 5–7, a flat wall or plate 45 has mounting holes 22 and another larger mounting hole 46 for accommodating a large diameter bolt. Hooks 50 are formed by bending up two lateral depending projections formed by the cut out portions 27. These hooks are so formed that they can support the head rod 35 in addition to the pulley loops 42 as shown in Fig. 7. Wall 45 depends perpendicularly from the flat wall or plate 48. Wall 48 has a further depending portion or lip 49 on which tit 26 is mounted. Lip 49 is bent inwardly to form angle B with wall 48 and is twisted in an oblique manner like ledge 24 to form an acute angle with wall 45. The bracket 20' of Figs. 5-7 may be regarded as the equivalent to the bracket 20 with lip 49 serving the purpose as shelf 24 to support the tit and spring. Hooks 50 serve to retain the rod 35 against the thrust of spring 5 in the same manner as eave 23. Wall 48 is equivalent to wall 21 in receiving side of spring 30. As shown in Fig. 7, spring 30 is wedged against the inner side of wall 48 and the adjacent side of rod 35 when the spring is fully tightened by means of handle 32.

In Figs. 8 to 11, the bracket 20'' has a form similar to that of bracket 20' except that tit 26 is omitted and a slot 52 is cut or formed in lip 49. Shoulders 54 are provided at the upper end of the slot so that the distance between the shoulders is greater than the maximum width of the slot. The slot 52 has its greatest width at the top thereof and may be straight sides or may be curved inwardly towards the bottom thereof. A cut-out 55 is formed in the wall 48 which is a continuation of the sides of shoulders 54. This cut-out extends only a short distance inwardly from lip 49. The spacing of shoulders 54 and width of cut-out 55 should be slightly greater than the maximum diameter of spring 30, and the width of the slot 52 should be slightly less than the maximum diameter of the spring. Cut-out 55 should be just large enough to permit turns 33 and 34 or cap 39 and turn 34 to pass wall 48 as the spring is forced down into slot 52. The head rod 35 will be retained in bracket 20'' by the solidly wedged spring which abuts the inner or under side of wall 48 and the adjacent side of the head rod, in the same manner as explained for bracket 20'. Hooks 50 support both the head rod and the pulleys 40 carrying ropes 41.

In each of the bracket forms described, it will be noted that the ledge 24 or lip 49 supporting the spring is twisted so that it is at an angle to the longitudinal axis of the head rod. This twist or bend is necessary to insure that the longitudinal axis of the spring remains perpendicular to the axis of the head rod. The degree of twist will primarily depend on the thickness of the metal of bracket portions 24 and 49. Greater thickness requires greater twist. It is preferred that the pitch of the spring in an untensioned condition be less than the thickness of the supporting bracket portion 24 or 49. The bending of ledge 24 and lip 49 at angle B directs the spring axially so that it becomes wedged against the adjacent side of walls 21 and 48 respectively.

The head rod should preferably have a slightly larger diameter than that of spring 30. Head rods of different diameters can be supported in the brackets 20, 20', 20'' without changing the size of spring 30. This is an important feature of the invention since it makes it unnecessary for installers to stock numerous brackets of different sizes as has been required with prior known head rod holders.

The spring 30 may be made of rustproof material such as stainless steel, but this is not necessary to avoid binding of the spring in the event the spring bracket or other awning portions rust. The wide pitch of the spring and its inherent resilient structure prevents it from binding so that it can always be unscrewed if necessary. Conventional rigid nuts and bolts have inflexible threads which frequently become frozen to each other and cannot be separated without destroying the nut, bolt or supporting bracket which results in considerable inconvenience and loss of time and labor.

The present type of clamp member can be snapped into the bracket in an easy one hand motion and can be manually tightened to effect a permanent support for the head rod. As many awning holders of the type described herein may be used as desired at spaced intervals depending on the length of the awning head rod.

The brackets may be pressed from sheet or cast by conventional methods. It is a strong, one piece structure which can be readily manufactured at low cost.

What is claimed and sought to be protected by Letters Patent of the United States is:

1. An awning head rod holder comprising a flat plate, one end portion of the plate being bent forwardly to form a wall portion for engaging said head rod, the opposite end of said plate being bent forwardly to provide a support thereon for a helical coil spring having spaced turns, said support being provided with means for engaging the spring thereon and disengaging the spring therefrom by lateral non-rotational movement of the spring perpendicular to its axis while permitting rotation of the spring to advance the spring axially toward and away from said wall portion, said support being bent at an acute angle to said plate.

2. An awning head rod holder, according to claim 9, said plate having a plurality of apertures therein for mounting the plate on a support, said first means being outwardly bent hooks providing a support for said rod, said second means being a lip, said lip having spring anchoring means adapted to prevent the spring from coming loose therefrom, said means being a tit projecting inwardly from the lip, said tit having a slanted inner end to facilitate lateral mounting the spring on the lip, said spring having one end bent to form a handle for turning the spring, the other end of the spring having the final turn formed with an outer diameter not greater than the inner diameter of the next adjacent turn.

3. An awning head rod holder, comprising a flat plate having a plurality of apertures therein for mounting the plate on a support, said plate having outwardly bent hooks providing a support for said rod, said plate being further bent to form a wall extending at an angle to the plate, said wall having its free end bent to form a depending lip, a helical coil spring rotatably supported on said lip, said lip having spring anchoring means adapted to prevent the spring from coming loose therefrom, said means being a slot in the lip having a width less than the diameter of the spring, said spring having one end bent to form a handle for turning the spring, the other end of the spring having the final turn formed with an outer diameter not greater than the inner diameter of the next adjacent turn.

4. An awning head rod holder, comprising a flat plate having a plurality of apertures therein for mounting the plate on a support, said plate having outwardly bent portions providing a support for said rod, said plate being further bent to form a wall extending at an angle thereto, said wall having its free end bent to form a depending lip, and a helical coil spring having spaced turns rotatably supported on said lip, said lip having spring anchoring means adapted to prevent the spring from coming loose therefrom, said lip extending between two adjacent spaced turns of the spring perpendicular to the axis of the spring to permit the spring to be moved laterally without rotation for disengagement from the lip.

5. An awning head rod holder, comprising a flat plate, one end portion of the plate being bent forwardly to form a first wall portion for engaging said head rod, an opposite end of said plate being bent forwardly to form a second wall portion for supporting a helical coil spring having spaced turns thereon, said second wall portion being provided with means for extending between adjacent spaced turns of the spring for engaging the spring by a lateral non-rotational movement and permitting rotation of the spring to move the spring axially toward and away from said first portion.

6. An awning head rod holder, comprising a flat plate, one end portion of the plate being bent forwardly to form a first wall portion for supporting said head rod, an opposite end of said plate being bent forwardly to form a second wall portion for supporting a helical coil spring thereon, said second wall portion being provided with means for securing the coil spring thereon while permitting rotation of the spring toward and away from said flat plate, said first wall portion including at least one hook thereon extending toward said second portion, said hook having a free end disposed to abut one side of the rod, said means being a depending lip formed on said second wall portion, said lip being twisted to compensate for the thickness thereof so that the spring is secured thereon with its longitudinal axis perpendicular to the axis of said head rod, said hook further providing means for supporting an awning pulley thereon, said lip being bent at an angle to said plate to dispose the axis of the spring perpendicular to the plate to wedge the spring between said rod and said lip.

7. An awning head rod holder, comprising a helical coil spring with spaced turns, and a bracket, said bracket including a flat plate, a first portion of the plate being bent forwardly to form a hook for supporting said head rod, an opposite end of said plate being bent forwardly to form a lip disposed between adjacent turns supporting the coil spring thereon, the lip being provided with a slot having opposed edges spaced closer together than the width of the spring, said opposed edges engaging between adjacent turns of the spring and permitting turning of the spring to advance the spring axially on the lip, whereby said spring may be wedged between said rod and said lip when fully tightened on the bracket, with said rod being retained between said spring and said hook.

8. An awning head rod holder, comprising a flat plate, one end portion of the plate being bent forwardly to form a first wall portion for supporting said head rod, an opposite end of said plate being bent forwardly to form a second wall portion for supporting a helical coil spring thereon, said second wall portion being provided with means for securing the coil spring thereon while permitting rotation of the spring toward and away from said first wall portion, said first wall portion including at least one hook thereon extending toward said second portion, said hook having a free end disposed to abut one side of the rod while said spring is wedged between said rod and said second wall portion, said means comprising a slot in said second wall portion, said slot having a width less than the diameter of said spring, said plate having a cut-out communicating with said slot and having a width greater than the diameter of said spring, said second wall portion being formed with a lip twisted to compensate for the thickness thereof so that the spring is secured thereon with its longitudinal axis perpendicular to the axis of said head rod, said hook further providing means for supporting an awning pulley thereon, said lip being bent at an angle to said plate to wedge the spring against the plate.

9. An awning head rod holder, comprising a helical coil spring having spaced turns, and a bracket, said bracket including a flat plate, a first portion of the plate being bent forwardly to form a first means for supporting said head rod, another portion of the plate being bent forwardly to form a second means for supporting the spring thereon, said second means extending between adjacent spaced turns of the spring to permit lateral non-rotational disengaging movement of the spring therefrom, said second means permitting the spring to be rotated to advance the spring axially thereon.

10. An awning head rod holder according to claim 9, wherein said second means is disposed at angle to said plate so that the axis of the spring is disposed perpendicular to the plate.

11. An awning head rod holder according to claim 9, wherein said second means is a lip having a spring anchoring element thereon adapted to prevent the spring from coming loose from the lip while being rotated, said spring having one end bent to form a handle for turning the spring, the other end of the spring having a final turn formed with an outer diameter not greater than the inner diameter of the next adjacent turn.

12. An awning head rod holder according to claim 9, wherein said second means is a lip having a spring anchoring element thereon adaped to prevent the spring from coming loose from the lip while being rotated.

13. An awning head rod holder according to claim 9, wherein said first means is a curved eave, said second means being a ledge provided with a tit to prevent the spring from coming off of the ledge while being rotated thereon.

14. An awning head rod holder according to claim 9, wherein said first means is a hook, said second means being a lip provided with a tit to prevent the spring from coming off of the lip while being rotated thereon.

15. An awning head rod holder according to claim 9, wherein said plate has a plurality of apertures therein for mounting the plate on a support, said first means being a plurality of hooks, said second means being a lip having a tit, said tit having a slanted end to facilitate lateral mounting of the spring on the lip, an inner end of said spring having a final turn formed with an outer diameter not greater than the inner diameter of the next adjacent turn.

16. An awning head rod holder according to claim 1, said wall portion including a plurality of hooks, said support being a lip provided with a tit having a slanted top projecting upwardly from said lip towards said wall portion.

17. An awning head rod holder according to claim 1, wherein said wall portion is a curved eave, said support being a ledge provided with a tit having a slanted top projecting upwardly toward said eave.

18. An awning head rod holder according to claim 1, wherein said wall portion is an eave extending toward said support, said support being a ledge, said angle compensating for thickness of said ledge so that the axis of said spring when engaged on the ledge extends perpendicular to said eave.

References Cited in the file of this patent

UNITED STATES PATENTS

| | | |
|---|---|---|
| 572,461 | Wagner | Dec. 1, 1896 |
| 960,771 | Astrup | June 7, 1910 |
| 1,931,148 | Heyer | Oct. 17, 1933 |
| 1,940,958 | Lewis | Dec. 26, 1933 |

FOREIGN PATENTS

| | | |
|---|---|---|
| 572,218 | Great Britain | Sept. 27, 1945 |